United States Patent
Moisio et al.

(10) Patent No.: US 6,366,082 B1
(45) Date of Patent: Apr. 2, 2002

(54) METHOD AND APPARATUS FOR DETERMINING PROPERTIES OF A MOVING WEB WITH A DIFFERENTIAL COIL SENSOR

(75) Inventors: Hannu Moisio, Kangasala; Mauri Ojala, Tampere, both of (FI)

(73) Assignee: Metso Paper Automation Oy, Tampere (FI)

( * ) Notice: Subject to any disclaimer, the term of this patent is extended or adjusted under 35 U.S.C. 154(b) by 0 days.

(21) Appl. No.: 09/248,753

(22) Filed: Feb. 12, 1999

(30) Foreign Application Priority Data

Feb. 26, 1998 (FI) .................................................. 980441

(51) Int. Cl.⁷ ................................................ G01B 7/06
(52) U.S. Cl. ...................................... 324/229; 324/241
(58) Field of Search ................................ 324/229, 230, 324/231, 239, 240, 241, 242, 243; 73/37.6, 37.7, 154

(56) References Cited

U.S. PATENT DOCUMENTS

| | | | | |
|---|---|---|---|---|
| 1,925,904 A | * | 9/1933 | Mayne ........................ 324/231 |
| 2,102,450 A | * | 12/1937 | Zuschlag ..................... 324/243 |
| 3,662,576 A | * | 5/1972 | Girlatschek ................. 324/229 |
| 4,528,507 A | | 7/1985 | Domin et al. ............... 324/229 |
| 4,791,367 A | | 12/1988 | Typpo ........................ 324/229 |
| 5,017,869 A | | 5/1991 | Oliver ........................ 324/230 |
| 5,418,823 A | | 5/1995 | Kervinen et al. ........... 376/245 |

FOREIGN PATENT DOCUMENTS

DE    2829264    2/1979

* cited by examiner

Primary Examiner—Walter Snow
(74) Attorney, Agent, or Firm—Ladas & Parry

(57) ABSTRACT

The invention relates to a method and an apparatus for measuring properties of a moving web, a sensor (1) being arranged on a first side of the moving web (7), the sensor comprising a differential coil (3), which comprises at least two coils, and a reference plate (4). A sensor plate (6) is arranged on a second side of the moving web (7). Electric current is used to induce a voltage to the differential coil (3). The voltage of the differential coil (3) varies as the web (7) changes the effect caused by the sensor plate (6) to the differential coil. The properties of the web (7) are determined by measuring the voltage of the differential coil (3).

11 Claims, 1 Drawing Sheet

Figure 1:
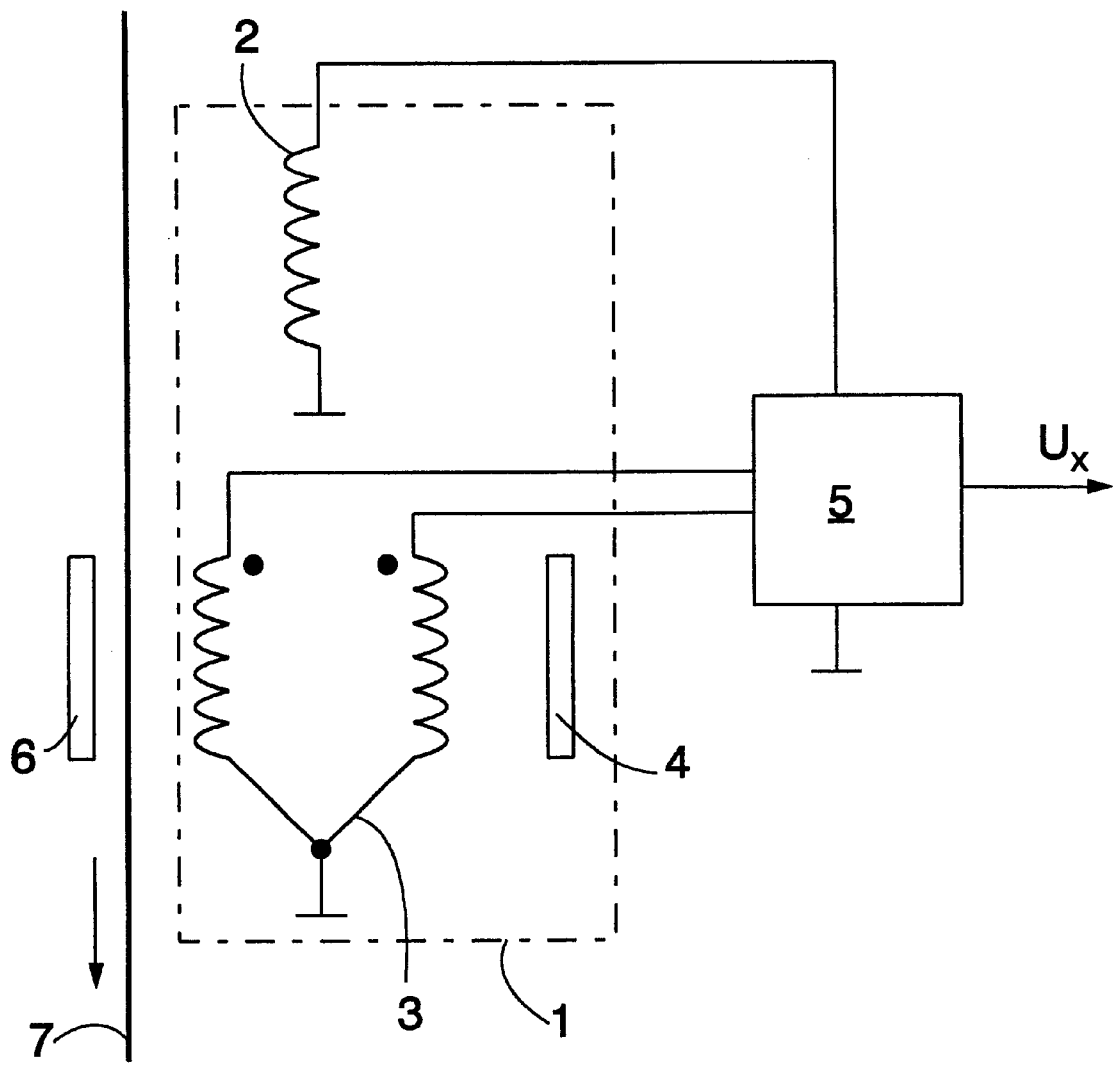

METHOD AND APPARATUS FOR DETERMINING PROPERTIES OF A MOVING WEB WITH A DIFFERENTIAL COIL SENSOR

The invention relates to a method of measuring properties of a moving web, the method comprising arranging a sensor on a first side of the moving web, the sensor comprising at least one coil, arranging a counterplate on a second side of the web, and feeding electric current to the coil.

The invention further relates to an apparatus for measuring properties of a moving web, the apparatus comprising a sensor, a counterplate and a control device, the sensor comprising at least one coil, the control device being adapted to feed electric current to the coil, the sensor being arranged on a first side of the moving web, and the counterplate being arranged on a second side of the moving web.

Measurements of properties of a moving paper web constitute the basis for controlling a paper machine. Continuous monitoring of properties, e.g. the caliper of paper, as the web moves, ensures that paper of the right quality is produced. The measurements serve to detect deviations in the web, and as a result, commands regarding necessary changes may be given to the actuators of the paper machine in order for the quality criteria to be fulfilled.

It is known to continuously measure the caliper of paper by apparatuses whose measuring heads are in contact with the paper web. In addition, U.S. Pat. No. 4,791,367 discloses a gauge for measuring the caliper of a web. The gauge comprises an upper head having a U-shaped magnetic pole piece whose legs are provided with windings. A lower head to be arranged on the opposite side of the paper web to be measured comprises a passive magnetic circuit which is a magnetic or ferrite plate. The magnetic flux established by the windings extends through the pole piece through the paper to the ferrite plate. The gap between the pole piece and the ferrite plate varies as the caliper of the paper web varies. The circuit inductance used to define the caliper of the paper web also varies simultaneously.

U.S. Pat. No. 4,528,507 discloses a solution for measuring properties of a moving web by sensors arranged on different sides of the web. One of the sensors is provided with a coil, the sensor on the opposite side of the web being provided with a counterplate. As the gap between the coil and the counterplate varies, the density of the magnetic flux established by the coil varies, and the caliper of the web is measured by detecting the variation in the density.

German Offenlegungsschrift 28 29 264 discloses a measuring apparatus, in which a sensor including a coil is arranged on both sides of the web. The caliper of the web is measured by defining the amplitude of the magnetic field established by the coils.

In all the above solutions, the sensor coils, typically made from copper wire, and the counterplates, e.g. of iron or ferrite, are heavy, making the sensors heavy and difficult to move flexibly along formations on the surface of paper. Furthermore, because the construction is heavy, the sensors are also very poorly adapted to float by air bearing, completely clear of the surface of paper.

It is an object of the present invention to provide a method and an apparatus for avoiding the above drawbacks.

The method of the invention is characterized in that the sensor arranged on the first side of the web comprises a differential coil, which comprises at least two coils, and a reference plate, that the counterplate is a sensor plate substantially similar to the reference plate, whereby electric current is used to induce to the differential coil a voltage which varies as the web changes the effect caused by the sensor plate to the differential coil, properties of the web being determined by measuring the voltage of the differential coil.

The apparatus of the invention is characterized in that the sensor arranged on the first side of the web comprises a differential coil, which comprises at least two coils, and a reference plate, that the counterplate is a sensor plate substantially similar to the reference plate, whereby electric current is used to induce to the differential coil a voltage which varies as the web changes the effect caused by the sensor plate to the differential coil, properties of the web being determined by measuring the voltage of the differential coil.

It is an essential idea of the invention that properties of a moving web are measured by a measuring apparatus comprising two plates. A measuring sensor comprises a differential coil, which comprises at least two coils, and a reference plate. A sensor plate is arranged on one side of the paper web to be measured and the first measuring sensor on the opposite side with respect to the sensor plate. The gap between the sensor plate and the differential coil varies according to the caliper of the paper web, the voltage generated by the differential coil varying in a corresponding manner. It is the idea of a preferred embodiment that the injection frequency applied in the solution exceeds 50 kHz.

It is an advantage of the invention that the sensors of the measuring apparatus of the invention can be made lightweight, whereby the sensors are able to give way to irregularities on the surface of the paper more flexibly than before. This decreases formation of holes in the paper. The lightweight construction of the invention also allows the sensors to be made such that they float by means of air bearing. The construction can be made lightweight, since, owing to the high injection frequency, the measuring apparatus requires no heavy ferromagnetic materials, such as iron, ferrite or a large conductor coil made from copper wire. In the solution of the invention the number of wire turns of the coils can be low, resulting in a small and lightweight measuring apparatus. This allows both the sensors of the apparatus to be made such that they float by means of air bearing. Owing to the high injection frequency, the reference plate and the sensor plate can also be made thin and their masses retained small.

The invention will be described in greater detail in the attached FIGURE, representing a schematic diagram of a solution of the invention.

The apparatus of the FIGURE comprises a measuring sensor 1, which in turn comprises a feed coil 2, a differential coil 3, which comprises two coils, and a reference plate 4. The measuring apparatus further comprises a control device 5 for feeding control current to the feed coil 2. The injection frequency of the feed coil is advantageously high, i.e. above 50 kHz, preferably above 200 kHz. Typically the injection frequency is about 250 kHz, but may be even 500 kHz or more. If the injection frequency is high, the number of wire turns of the coils 2 and 3 can be low, resulting in a small and lightweight measuring sensor.

The feed coil 2 induces to the differential coil circuit a voltage which can be measured by the control device 5 by e.g. lock-in type of detection. The reference plate 4 is arranged on one side of the differential coil. The gap between the differential coil 3 and the reference plate 4 is substantially constant at all times. A sensor plate 6 is arranged on that side of the differential coil 3 which is opposite with regard to the reference plate 4. The structures of the reference plate 4 and the sensor plate 6 are substantially identical. The plates are made from a material which efficiently conducts electricity, e.g. copper. The plate can also comprise merely a conductive metal surface produced by vaporizing. When the material effectively conducts electricity, a thin conductive layer is sufficient. A thin conductive layer is sufficient because the higher the injection frequency, the smaller is the current penetration depth inside the conducting body. Furthermore, owing to a high injection frequency, the plates 4 and 6 can be made thin and consequently their masses can be kept small.

The measuring sensor 1 is placed on a first side of a web 7 and the sensor plate 6 to a second side of the web 7, i.e. the opposite side with regard to the measuring sensor 1. The web 7 is a moving web and can be e.g. a paper or paperboard web, whose caliper is to be measured. The measuring sensor 1 and the sensor plate 6 are arranged either in contact with the web 7 or close to the surface of the web 7 e.g. by means of air bearing. As the caliper of the web 7 varies, the distance between the sensor plate 6 and the measuring sensor 1 and, naturally, the differential coil 3 and the reference plate 4, varies. This variation in distance caused by the caliper of the web 7 affects the voltage of the differential coil 3 to be detected by means of the control device 5. Accordingly, the control device 5 produces a voltage $U_x$, which is proportional to the distance between the differential coil 3 and the sensor plate 6, i.e. the caliper of the web 7.

The apparatus may be calibrated by paper samples of known calipers, whereby the obtained voltage readings can be easily converted into caliper readings.

The coils 2 and 3 can be made extremely small and lightweight by e.g. the printed circuit technique. In this case the sensor 1 can also be arranged to float by means of air bearing.

The measuring apparatus of the invention can be used particularly for measuring the caliper of a paper web. If desired, the plates 4 and 6 can be made from a dielectric material, should the target to be measured so require.

The figure and the related description are only intended to illustrate the inventive idea. The details of the invention may vary within the scope of the claims. The feed coil 2 is not necessary, but electric current may also be fed directly to a part of the differential coil 3. In this case said part of the differential coil 3 would serve as the feed coil 2. Furthermore, the structure of the differential coil 3 may comprise more than two coils. The differential coil 3 is most preferably symmetric, whereby the voltage $U_x$ produced by the control device 5 is close to zero at least in e.g. caliper measurements involving thinner qualities.

What is claimed is:

1. A method of determining properties of a moving web, the method comprising:

arranging a sensor on a first side of a moving web, the sensor comprising a differential coil, which comprises at least two coils, and a reference plate;

arranging a sensor plate on an opposite, second side of the web, the sensor plate being substantially similar to the reference plate;

feeding electric current to the differential coil to induce to the differential coil a voltage which varies as the web changes the effect caused by the sensor plate to the differential coil; and determining properties of the web by measuring the voltage of the differential coil, wherein the moving web is a paper or paperboard web.

2. A method as claimed in claim 1, wherein the sensor arranged on the first side of the web comprises a feed coil and electric current is fed to the feed coil, a voltage being induced to the differential coil by means of the feed coil.

3. A method as claimed in claim 1, wherein the reference plate and the sensor plate are metal plates.

4. A method as claimed in claim 1, wherein the distance of the sensor plate with respect to the differential coil varies as the caliper of the web varies, the caliper of the web being determined by measuring the voltage of the differential coil.

5. A method as claimed in claim 1, wherein the injection frequency of the feed coil exceeds 50 kHz.

6. A method as claimed in claim 1, wherein the voltage of the differential coil is detected by a lock-in type of detector.

7. An apparatus for determining properties of a moving web, the apparatus comprising:

a sensor comprising a differential coil, which comprises at least two coils, and a reference plate;

means for arranging the sensor on a first side of a moving web;

a sensor plate, the sensor plate being substantially similar to the reference plate; and means for arranging the sensor plate on an opposite, second side of the moving web, whereby electric current is used to induce to the differential coil a voltage which varies as the web changes the effect caused by the sensor plate to the differential coil, properties of the web being determined by measuring the voltage of the differential coil, wherein the moving web is a paper or paperboard web.

8. An apparatus as claimed in claim 7, wherein the sensor arranged on the first side of the web comprises a feed coil for inducing a voltage to the differential coil by feeding electric current to the feed coil.

9. An apparatus as claimed in claim 7, wherein the reference plate and the sensor plate are metal plates.

10. An apparatus as claimed in claim 7, wherein the distance of the sensor plate with respect to the differential coil is arranged to vary in accordance with variations in the caliper of the web, a control device being arranged to produce a voltage proportional to the caliper of the web.

11. An apparatus as claimed in claim 7, wherein the injection frequency exceeds 50 kHz.

* * * * *